United States Patent [19]

Matsumoto et al.

[11] Patent Number: 4,477,163

[45] Date of Patent: Oct. 16, 1984

[54] FILM TRANSPORTING DEVICE FOR USE IN A CAMERA

[75] Inventors: Toshiaki Matsumoto, Izumisano; Nobuyuki Taniguchi, Tondabayashi, both of Japan

[73] Assignee: Minolta Camera Kabushiki Kaisha, Osaka, Japan

[21] Appl. No.: 435,217

[22] Filed: Oct. 19, 1982

[30] Foreign Application Priority Data

Oct. 20, 1981 [JP] Japan .................. 56-168242[U]

[51] Int. Cl.³ .................. G03B 1/18; G03B 17/36
[52] U.S. Cl. .................. 354/173.11; 354/213; 354/214; 354/217
[58] Field of Search ............ 354/171, 173, 206, 213, 354/214, 215, 217, 218, 173.11, 173.1, 266, 268, 235.1, 234.1, 412

[56] References Cited

U.S. PATENT DOCUMENTS 4,294,527 10/1981 Hashimoto et al. ............ 354/173 X

FOREIGN PATENT DOCUMENTS 39-36248 12/1964 Japan .
51-15928 2/1976 Japan .
52-164525 12/1977 Japan .

Primary Examiner—William B. Perkey
Attorney, Agent, or Firm—Jackson, Jones & Price

[57] ABSTRACT

A film transporting device for use in a camera disclosed is so designed as to rewind the film such that no film portion is engaged in film take-up sprocket, resulting in an easy take out of the used film. The device in one form includes a counter that counts up the number of frames during a wind-up operation is carried out after the positioning of a film leader in contact with the take-up sprocket, and during a rewind operation, the counter counts down the same number of frames, or more, to locate the film leader in a disengaged position from the sprocket. The device in another form includes a film perforation detector. In this form, the film rewind operation is carried out until the perforation detector stops detecting the perforation. In a further form, the device includes a mechanical counter which counts up the frames used during wind-up operation, and during rewind operation counts down more than the number counted up to ensure that the film leader portion is withdrawn from the take-up sprocket.

28 Claims, 7 Drawing Figures

FILM TRANSPORTING DEVICE FOR USE IN A CAMERA

BACKGROUND OF THE INVENTION

1. Field of the Invention

The present invention relates to a still camera and, more particularly, to a film transporting device for use in such a camera.

2. Description of the Prior Art

Generally, a film transporting device for use in a still camera has an up-down counter which counts up used frames during a series of photographing operations. More particularly, the up-down counter counts up by one as the film is pulled out for one frame from a film cartridge, with the used frame being wound on a film take-up spool. The up-down counter counts down the frames during a rewind operation and is carried out to control the timing to interrupt the rewind operation. More particularly, the up-down counter counts down by one as the film is rewound for one frame back into the film cartridge.

According to the prior art film transporting device, the up-down counter is so actuated as to start the up-count from an initial value, such as zero, after the closure of the camera's back lid. Furthermore, according to the prior art, the film rewinding operation is interrupted when the up-down counter has counted down to the initial value. Therefore, the prior art film transporting device has such a disadvantage particularly in removing, or unloading, the film, as explained below.

From a practical point of view, when loading a film into a camera, an operator pulls out a leading end portion of the film for a certain length from a film cartridge, engages the perforations of the film with the sprocket teeth, and then, engages the leading end of the film on a take-up spool. Furthermore, before he closes the rear cover, he usually advances a couple frames to make sure that the film is correctly loaded and that the film portion spanning across the camera's shutter window is taut. Then, he closes the rear cover and makes a couple of blind shots, so that the frame counter advances from "S" to "0", ready for taking photographs. During the photographing, the film is wound on the take-up spool. Since the counter is actuated after the closure of the back lid, it counts up the number of frames for said blind shots and photographing shots.

When unloading the film from the camera, the film transporting device of the prior art is operated to rewind the film back into the cartridge, and during such a rewinding operation, the counter counts down the same amount as the amount it has counted up. When the counter is counted down to its initial value, such as zero, the film rewinding completes.

According to the prior art film transporting device, even after the completion of a rewinding operation, the film leading portion is not completely withdrawn from a sprocket, but is still wound on the take-up spool. Therefore, in order to remove the film, the operator has to further rewind the film leading portion from the take-up spool and to wind the leading portion into the cartridge.

SUMMARY OF THE INVENTION

The present invention has been developed with a view to substantially solving the above described disadvantage and has for its object to provide an improved film transporting device which can completely rewind the film from the take-up spool.

In accomplishing these and other objects, a film transporting device according to the present invention comprises means for interrupting the film rewind operation after the film leading portion has been withdrawn from sprocket.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which

FIG. 5b is a perspective view of a portion of the arrangement shown in FIG. 5a.

DESCRIPTION OF THE PREFERRED EMBODIMENTS

Before the description of the preferred embodiments proceeds, it is to be noted that the camera involved in the various embodiments disclosed herein is a type which automatically stops the action of an auto-wind-up mechanism after the advance of a film for a predetermined length (for example, a length corresponding to "8" perforations) covering one frame and then automatically charges an exposure control mechanism to accumulate energy for the aperture control and shutter control.

Figure 1:
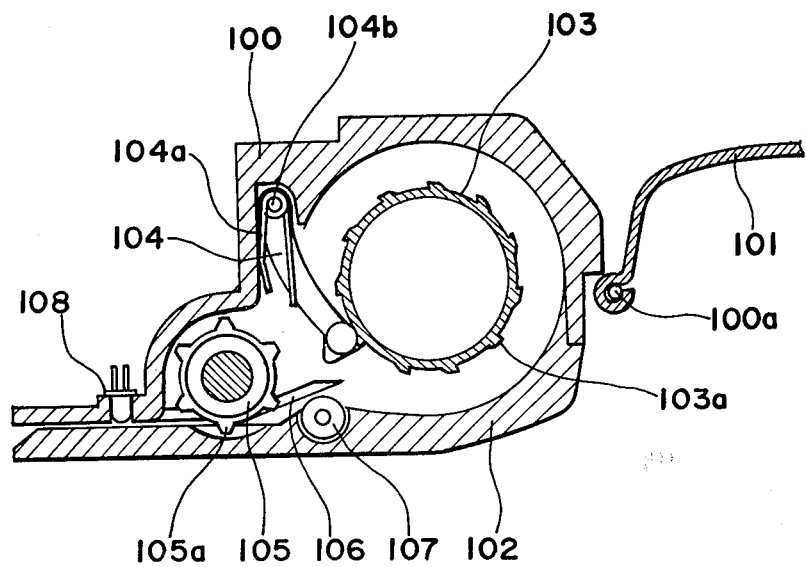
FIG. 1 is a diagrammatic view of a film take-up portion according to a first embodiment of the present invention.

Referring to FIG. 1, there is shown a mechanical part of a film transporting device according to a first embodiment of the invention. In FIG. 1, a reference numeral 100 designates a camera body, and 101 designates a back lid pivotally connected at 100a to the camera body 100. A reference numeral 102 is an inner cover fixedly connected to the camera body 100. A reference numeral 103 designates a film take-up spool having a plurality of projections 103a extending outwardly for the engagement with perforations of the film (not shown). A plate 104 has one end pivotally connected at portion 104b to the camera body 100 and the other end located along a periphery of the spool 103. A hair pin spring 104a is provided between the plate 104 and the camera body 100 for biasing the plate 104 counterclockwise about the pin 104b, so that said other end of the plate 104 is pressure held against the periphery of the film take-up spool 103, ensuring the engagement of the spool's projections 103a with the film perforation and, at the same time, effecting the tight winding of the film on the film take-up spool 103.

A reference numeral 105 designates a sprocket having a plurality of teeth 105a for the engagement with perforations on the film. Upon counterclockwise rotation of the sprocket 105, the film is advanced towards the film take-up spool 103. A reference numeral 106 designates a film guide plate, and 107 designates a roller. By the film guide plate 106 and the roller 107, the film, which has moved past the sprocket 105, is guided towards the film take-up spool 103 and is wound on the spool 103.

Reference numeral 108 designates a photocoupler for detecting the pass of each of the perforations on the film. This photocoupler 108 is positioned rearwardly of the sprocket 105 with respect to the direction of the wind-up of the film so that, when the leading portion of the film is inserted in between the inner cover 102 and the body 100 with the leading portion of the film consequently touching the sprocket 105 and when the film wind-up is subsequently initiated, the photocoupler 108 can be brought into operation to detect the pass of the perforations on the film. A train of pulses emerging from this photocoupler 108 is supplied to an up-down counter, as will be described later, and is then counted thereby. This counter performs a count-up operation during the film wind-up operation, and a count-down operation during the film rewind operation. When the film rewind operation takes place, the counter performs the count-down operation and, when the counter so performed becomes zero, the film rewind is automatically interrupted. At this time, the film remains inserted in between the inner cover 102 and the body 100 as is the case with the initial insertion thereof, but the perforation on the film is disengaged from the tooth 105a of the sprocket 105, and accordingly, the film can readily be removed from the camera.

The above described film transporting mechanism is controlled by a circuit shown in FIG. 2 described below.

Figure 2:
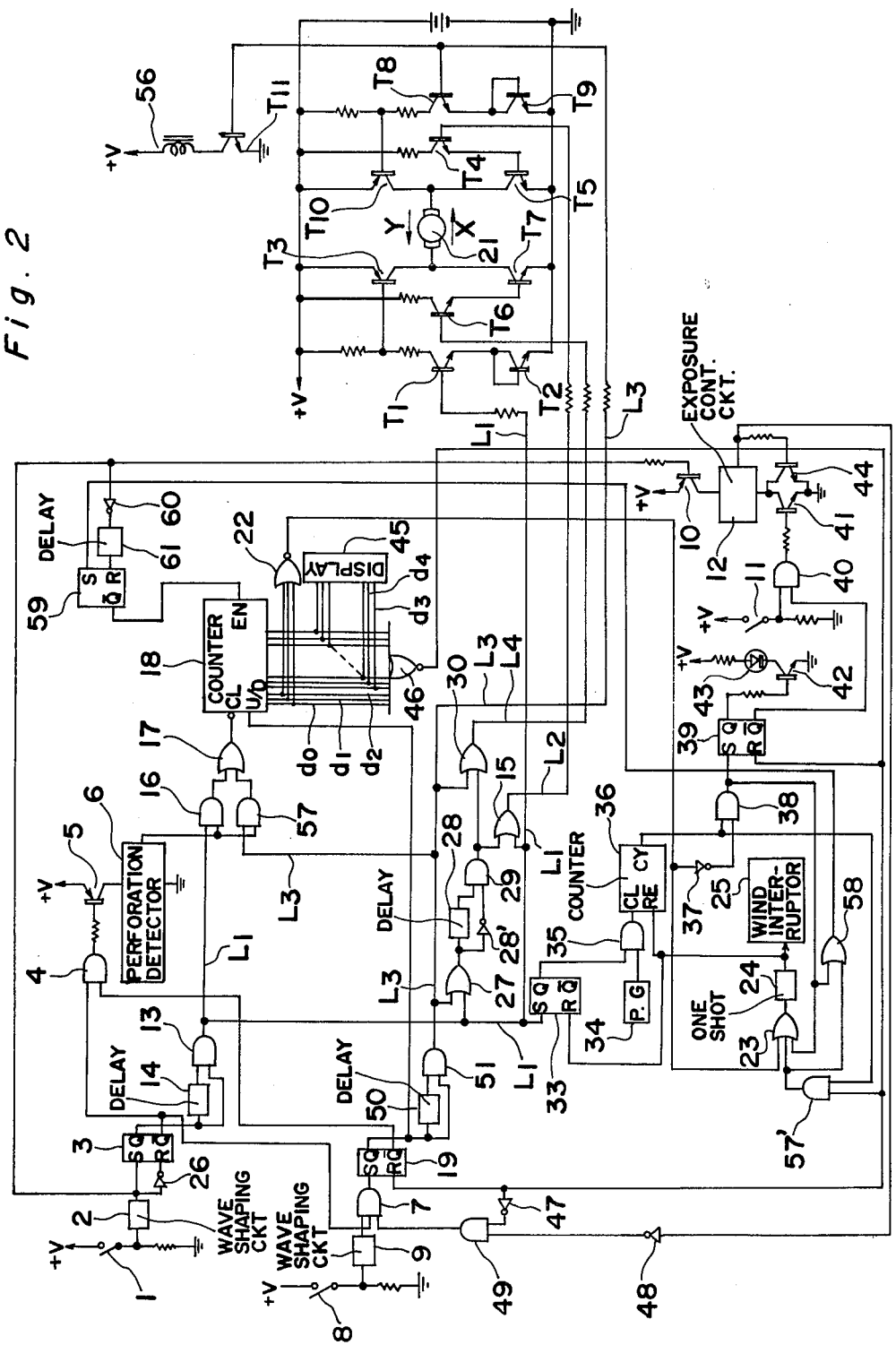
FIG. 2 is a circuit diagram according to the first embodiment of the present invention.

Referring to FIG. 2, there is shown a circuit diagram of the film transporting device of the first embodiment. In FIG. 2, a switch 1 closes in response to the completion of an exposure control operation, such as a closure of a shutter curtain (not shown) or a flip-down movement of a flip motion mirror (not shown) which controls the path of light beams received through the lens (not shown) alternately to eye-piece and to image plane, and opens in response to the completion of charge of an exposure control mechanism (not shown), such as a charge of a spring for controlling shutter mechanism. Therefore, at a moment when the switch 1 opens, the film wind-up operation is completed.

It is to be noted that the exposure control operation and the charging of the exposure control mechanism are carried out not only when the back lid 101 is held closed, but also when the back lid 101 is held opened. Therefore, the turning of the switch 1 on and off is carried out regardless of condition of the back lid 101, whether it being closed or opened.

To start the film wind-up operation, the switch 1 closes in response to the completion of exposure control operation. Upon closure of the switch 1, a wave shaping circuit 2 produces a high level signal. The high level signal produced from the wave shaping circuit 2 is applied to a base of transistor 10 for turning the transistor 10 to a non-conductive state. Accordingly, during when the switch 1 is maintained turned on, no electric power will be supplied to an exposure control circuit 12, even if a shutter release switch 11 is turned on.

Furthermore, by the positive edge of the high level signal produced from the wave shaping circuit 2, a flip-flop 3 is turned to a set condition, and, accordingly, the flip-flop 3 produces a low level signal from its $\overline{Q}$ terminal, and a high level signal from its Q terminal.

The low level signal produced from the $\overline{Q}$ terminal of the flip-flop 3 is applied to an AND gate 4 and, accordingly, the AND gate 4 also produces a low level signal. This low level signal from the AND gate 4 turns a transistor 5 to a conductive state for effecting the start supply of electric power to a perforation detector 6. Furthermore, the low level signal from the $\overline{Q}$ terminal of the flip-flop 3 is also applied to an AND gate 7 for interrupting the transmission of a signal from a wave shaping circuit 9, which produces a high level signal in response to the closure of a rewind switch 8, to a flip-flop 9.

The high level signal produced from the Q terminal of the flip-flop 3 is applied to an AND gate 13 and also to a delay circuit 14. The delay circuit 14 is connected to the AND gate 13. Thus, when the delay circuit 14 produces a high level signal after a predetermined period of time, the AND gate 13 produces a high level signal along lead lines designated by a reference character L1. One of the lead line L1 is connected to an OR gate 15 and, accordingly, the OR gate 15 produces a high level signal along a lead line L2. The high level signal carried by the lead line L1 is applied to the base of a transistor T1, and, at the same time, the high level signal carried by the lead line L2 is applied to the base of a transistor T4. Accordingly, transistors T1, T2, T3, T4 and T5 turn to a conductive state to permit current flow in a direction X through a d.c. motor 21, thus driving the motor 21 in one direction and, thereby effecting the film wind-up operation.

During the film winding, the perforation detector 6 produces a train of pulses as it detects the film perforations in a manner described later in connection with FIG. 4. At this moment, since the lead line L1 is carrying a high level signal produced from the AND gate 13 to AND gate 16, the train of pulses produced from the perforation detector 6 is applied through AND gate 16, OR gate 17 to a clock terminal CL of an up-down counter 18. Since a flip-flop 19 is maintained in a reset condition during the film wind-up operation, its Q terminal produces a low level signal which is applied to a mode select terminal U/D of the counter 18 and, accordingly, the counter 18 is held in the up-count mode. Therefore, the counter 18 counts up as it receives negative edge of each of the pulses from the perforation detector 6. As the counter 18 receives the pulses, its least significant 3-bit outputs d0, d1 and d2 produce a combination signal in a sequence of "000", "001", "010", —, and when it has counted "8" pulses, corresponding to 1 frame, the least significant 3-bit outputs d0, d1 and d2 produce a combination signal "000" and, at the same time, a next significant bit output d3 changes from "0" to "1".

When the 3-bit outputs d0, d1 and d2 produce "000" upon counting one frame, a NOR gate 22 produces a high level signal which is applied through an OR gate 23 to a one-shot circuit 24. Accordingly, the one-shot circuit 24 produces a one-shot pulse which is applied to a wind interruptor 25. Upon receipt of the one-shot pulse, the wind interruptor 25 is so actuated as to interrupt the film winding operation by a wind mechanism (not shown) to stop winding the film. At this moment, driving force of the motor 21 is transmitted to the camera's exposure control mechanism by a suitable transmission mechanism (not shown) to effect the charge of exposure control mechanism, such as accumulation of energy in aperture control spring and shutter control spring. When this charging of exposure control mechanism completes, the switch 1 opens and, accordingly, the output from the wave shaping circuit 2 changes from high to low level signal. Thus, an inverter 26 produces a high level signal to a reset terminal of the flip-flop 3, thereby resetting the flip-flop 3. At this moment, the Q terminal of the flip-flop 3 produces a low level singal and, accordingly, the lead line L1, which has been carrying a high level signal, carries a low level signal. Thus, an OR gate 27 produces a low level signal which is applied to a delay circuit 28 and also to an inverter 28'. The outputs of the delay circuit 28 and the inverter 28' are connected to an AND gate 29. Accordingly, the AND gate 29 produces a high level signal for a predetermined period of time defined by the delay circuit 28 and, thereafter, it produces a low level signal. The high level signal produced from the AND gate 29 is applied through OR gates 15 and 30 and, accordingly, lead lines L2 and L4 carry a high level signal for said predetermined period of time determined by the delay circuit 28. During the lead lines L2 and L4 carrying the high level signal, the other lead lines L1 and L3 are carrying a low level signal. Accordingly, transistors T4, T5, T6 and T7 are turned to a conductive state for said predetermined period of time. Thus, both two terminals of the d.c. motor 21 are temporarily shortcircuited to stop the rotation of the motor 21 with a braking effect.

As described above, at the moment when the charging operation of camera's exposure control mechanism completes, the lead line L1 starts to carry a low level signal, and, at this moment, the counter 18 has been already counting "8" pulses obtained from the perforation detector 6, and the AND gate 16 is producing a low level signal. Accordingly, the negative edge of the signal carried on the lead line L1 to the low level will not be counted by the counter 18. Therefore, the counter 18 counts only the pulses obtained from the perforation detector 6. Furthermore, at this moment, since the flip-flop 19 is in the reset condition, its $\overline{Q}$ terminal is producing a high level signal. Thereafter, when the flip-flop 3 is turned to reset condition to produce a high level signal from its $\overline{Q}$ terminal, the AND gate 4 produces a high level signal, resulting in a non-conductive state of the transistor 5. Accordingly, the electric power supply to the perforation detector 6 is intercepted.

Next, an operation which takes place in the event that the film is held taut to such an extent that the film wind-up is no longer performed will be described.

As described above, upon completion of camera's exposure control operation, the switch 1 turns on to turn the flip-flop 3 to a set condition, thereby producing a high level signal from the AND gate 13 along the lead line L1. The high level signal on the lead line L1 drives the motor 21 to start the film wind-up operation and, at the same time, turns a flip-flop 33 to a set condition. Thus, a Q terminal of the flip-flop 33 produces a high level signal, enabling an AND gate 35 to transmit a train of pulses produced from a pulse generator 34 to clock terminal CL of a counter 36. The counter 36 counts a predetermined number of pulses. The counting of the predetermined number of pulses by the counter 36 takes a period of time which is slightly longer than the maximum time it is necessary to wind-up one frame, i.e., to count "8" pulses by the counter 18. When the counter 36 has counted the predetermined number of pulses from the pulse generator 34, its carry terminal CY produces a pulse which is applied to an AND gate 38. In this case, if the film is held taut to such an extent that the film wind-up can not be performed any longer, the least significant 3-bit outputs d0, d1 and d2 are producing a combination signal other than "000". Accordingly, a NOR gate 22 produces a low level signal, and thus, an inverter 37 produces a high level signal. The high level signal produced from the inverter 37 enables the AND gate 38 to transmit the high level signal from the counter 36 through an OR gate 23 to the one-shot circuit 24. Thus, the one-shot circuit 24 produces a one-shot pulse which is applied to the wind interruptor 25 so as to interrupt the film winding operation by a wind mechanism (not shown) to stop winding the film. The one-shot pulse produced from the one-shot circuit 24 is also used for resetting the flip-flop 33 and the counter 36.

The above operation is carried out in the event that the film is held taut, for some reason or other, to such an extent that the film wind-up is no longer possible. When the film wind-up is no longer possible, the driving force of the motor 21 is transmitted to the exposure control mechanism in the same manner described above for the operation carried out upon completion of the film wind-up, and therefore, the charge of the exposure control mechanism is carried out. When this charging operation of the exposure control mechanism completes, the switch 1 opens to reset the flip-flop 3. Thus, the motor 21 stops in the same manner described above as the operation carried out upon completion of the film wind-up.

Furthermore, in the event that the film is held taut to such an extent that the film wind-up is no longer possible, the pulse produced from the AND gate 38 is also applied to a set terminal S of a flip-flop 39 and, therefore, the flip-flop 39 produces a high level signal from its Q terminal and a low level signal from its $\overline{Q}$ terminal. The low level signal from the $\overline{Q}$ terminal of the flip-flop 39 is applied to an AND gate 40 and, therefore, a transistor 41 is maintained non-conductive even if the shutter release switch 11 is turned on. Thus, the exposure control circuit 12 remains inoperative, resulting in a locked condition of the shutter release mechanism. The high level signal from the Q terminal of the flip-flop 39 is applied to a transistor 42 which accordingly turns to a conductive state. Thus, a light emitting diode 43 is actuated to emit light for the indication that the film rewinding operation is required.

In the case where the film wind-up operation is carried out smoothly without any film taut, the switch 1 is turned off in response to the completion of charge of the exposure control mechanism. Thus, the transistor 10 is turned to a conductive state. Thereafter, when the shutter release switch 11 is turned on, the transistor 41 conducts to supply electric power to the exposure control circuit 12, thereby exposure control is initiated. When the exposure control circuit 12 is supplied with electric power, it produces a high level signal to a transistor 44. Accordingly, the transistor 44 is turned to a conductive state to continue the power supply to the exposure control circuit 12 even after the opening of the shutter release switch 11. When the exposure control completes, the switch 1 is turned on to a turn the transistor 10 to non-conductive state. Accordingly, the power supply to the exposure control circuit 12 is intercepted.

Next, signals from the counter 18 is further described.

In addition to the outputs d0, d1 and d2 mentioned above, the counter 18 further has outputs d3, d4, —(output) signals from these outputs are so weighted as to indicate digits higher than least significant 3-bits) which are connected to a display device 45 for the display of number of frames photographed. The display device 45 includes a decoder for decoding data obtained from the counter 18, segments used to exhibit numerical figures such as, liquid crystal, electrochromic display, light emitting diodes, etc., and a driver for driving the segments.

It is to be noted that the decoder provided in the display device 45 is prearranged such that, it produces data necessary to display "0" by the segments when the data obtained from the outputs d3, d4, —is equal to or greater than "000—000" and equal to or smaller than "000—101", that is when the counter 18 has counted 5 frames, and to display "1" by the segments when the data obtained from the outputs d3, d4, —is equal to "000—110" corresponding to 6 frames. Thereafter, as the counter 18 counts one frame, the indication on the display device 45 increases by one. In other words, the display device 45 displays a numerical figure which is equal to the number of frames counted by the counter 18 subtracted by "5". The difference "5" between the number counted by the counter 18 and the number displayed through the display device 45 is provided because of the fact that, from a practical point of view, the photographing is carrying out not from the very leading edge of the film but after taking about "5" blank shots. In this sense, the difference "5" is not a fixed number but can be change to another number such as "4" or "6".

Next, the rewind operation is described. When the film loaded in the camera is wound up for some length, the number of pulses counted by the counter 18 is greater than zero and, accordingly, the outputs d0, d1, d2, d3, d4, —of the counter 18 produce a combination signal which is other than (000—000). Thus, a NOR gate 46 produces a low level signal which is inverted to a high level signal by an inverter 47. At this moment, since the exposure control circuit 12 is in an inoperative condition, an inverter 48 produces a high level signal. Accordingly, an AND gate 49 produces a high level signal which is applied to one input of another AND gate 7. Furthermore, at this moment, the charging operation of the exposure control mechanism is completed and, therefore, the flip-flop 3 is in a reset condition producing a high level signal from its $\bar{Q}$ terminal.

Thereafter, when a rewind switch 8 is turned on, the wave shaping circuit 9 produce a high level signal which is applied through the AND gate 7 to a set terminal of a flip-flop 19. Accordingly, the flip-flop 19 produces a high level signal from its Q terminal and a low level signal from its $\bar{Q}$ terminal.

The low level signal produced from the $\bar{Q}$ terminal of the flip-flop 19 is applied to AND gate 4 and, therefore, the AND gate 4 provides a low level signal to the base of the transistor 5. Accordingly, electric power is supplied to the perforation detector 6.

The high level signal produced from the Q terminal of the flip-flop 19 is applied to mode select terminal U/D of the counter 18 and, accordingly, the counter 18 is held in the down-count mode. The high level signal from the Q terminal of the flip-flop 19 is also applied both to a delay circuit 50 and an AND gate 51. The output of the delay circuit 50 is connected to the AND gate 51. Accordingly, after a predetermined period of time determined by the delay circuit 50 from the moment of closure of the rewind switch 8, the AND gate 51 produces a high level signal and, at the same time, the OR gate 30 produces a high level signal. Such high level signals are transmitted along lead lines L3 and L4 causing transistors T6, T7, T8, T9 and T10 to become conductive. Thus, a current flows through the motor 21 in a direction Y, driving the motor 21 in a direction opposite to the direction effected during the film windup operation. Furthermore, by the high level signal carried along the line L3, a transistor T11 turns to a conductive state to excite an electromagnet 56. Accordingly, an electromagnet clutch mechanism (not shown) is so actuated as to transmit the driving force of the motor 21 to a film rewind mechanism (not shown) to carry out the film rewind operation.

During the film rewinding, the perforation detector 6 produces a train of pulses as it detects film perforations. Such a train of pulses is applied through AND gate 57 and OR gate 17 to the clock terminal CL of the counter 18. Since the counter 18 is in the down-count mode, it counts down by one as it receives "8" pulses from the perforation detector 6. Accordingly, the frame number displayed through the display device 45 decreases one by one.

When the frame number displayed through the display device 45 reaches down to zero, it is understood from the foregoings that the counter 18 has counted down to "5" (000—101), because there is a difference "5" between the number carried by the counter 18 and the number displayed through the display device 45. At this moment, the motor 21 continues to run to further count down the counter 18.

When the counter 18 has counted down to "0", its outputs d0, d1, d2, d3, —produce a combination signal (000—000). Accordingly, the NOR gate 46 produces a high level signal which is applied to a reset terminal R of the flip-flop 19. Thus, the flip-flop 19 is turned to a reset condition for producing a low level signal from its Q terminal. Thus, the AND gate 51 produces a low level signal which is carried along the lead line L3. Accordingly, the transistors T8, T9 and T10 are turned to a non-conductive state. The low level signal on the lead line L3 is also applied through the OR gate 27 to both the delay circuit 28 and the inverter 28'. Therefore, the inverter 28' produces a high level signal, and the delay circuit 28 produces a high level signal for a predetermined period of time determined by the delay circuit and thereafter, it produces a low level signal. Thus, the AND gate 29 produces a high level signal for said predetermined period of time and, thereafter, produces a low level signal. The high level signal produced from the AND gate 29 is applied to both OR gates 15 and 30. Accordingly, the lead lines L2 and L4 carry high level signals for said predetermined period of time. These high level signals on the lead lines L2 and L4 cause transistors T4, T5, T6 and T7 to become conductive. Thus, both terminals of the motor 21 are temporarily shortcircuited to stop the motor 21 with a braking effect, thereby completing the rewind operation.

In the above rewind operation, the positive edge of the high level signal produced from the NOR gate 46 causes flip-flop 39 to assume a reset condition. Accordingly, the light emitting diode 43 stops the emission of light and, at the same time, the AND gate 40 is enabled to permit signal transmital from the shutter release switch 11 to the transistor 41. Furthermore, by the low level signal carried by the lead line L3, the transistor T11 is turned to a non-conductive state to deactivate the electromagnet 56. Thus, the electromagnetic clutch mechanism is released to disengage the motor 21 from the rewind mechanism.

When the rewind operation is completed, the counter 18 is counted down to (000—000). Accordingly, the film is in the same condition as initially loaded. That is, the leading portion of the film is inserted in between the inner cover 102 and the body 100 with the leading portion of the film consequently touching the sprocket 105. Therefore, the film can be simply taken out from the camera.

In the first embodiment described above, the delay circuit 14 is provided to effect the film wind-up operation after a predetermined period of time from a moment when the perforation detector 6 is supplied with power. The reason for this is to stabilize the perforation detector 6 before it produces any pulses and, thus, preventing any error count in the counter 18.

It is to be noted that, if the rewind switch 8 is turned on with no film loaded in the camera and with the content of the counter 18 being (000—000), the rewind operation will not be carried out, because the signal produced from the inverter 47 is a low level signal.

It is also to be noted that, if the switch 1 is turned on with no film loaded in the camera, the motor 21 rotates in the direction X to start the wind-up operation and, at the same time, the counter 36, provided for detecting the film taut, starts to count clock pulses from the pulse generator 34. In this case, since no film is loaded, the output from the counter 18 remains (000—000). Thus, the NOR gate 46 continues to produce a high level signal. After a predetermined period of time from the start rotation of the motor 21, the counter 36 produces a pulse from its carry terminal CY. The pulse produced from the carry terminal CY is applied through AND gate 57' and OR gate 23 to the one-shot circuit 24. Thus, the one-shot circuit 24 produces a one-shot pulse which is applied, to the wind interruptor 25, resulting in interruption of the wind-up operation. Immediately thereafter, the charging of the exposure control mechanism is carried out and, when this is completed the motor 21 stops running.

In the event that no film is loaded in the camera, the perforation detector 6 continues to produce a high level signal. Therefore, when transistor 5 becomes non-conductive upon completion of the wind-up operation, the output from the perforation detector 6 changes to a low level signal, resulting in a possibility of an error count-up in the counter 18. Such an error count-up may also occur at the end of the wind-up operation of a final frame of a film properly loaded in the camera. In order to avoid such an error count-up, a flip-flop 59 is provided. More particularly, in the case of no film loaded in the camera or in the case of final frame wind-up, a pulse produced from AND gate 57' is applied through OR gate 58 to flip-flop 59, thereby turning the flip-flop 59 to a set condition. Accordingly, the $\overline{Q}$ terminal of the flip-flop 59 produces a low level signal which is applied to terminal EN of the counter 18, turning the counter 18 to an inoperative condition. Therefore, when the perforation detector 6 changes its output from a high to low level signal at a moment when the switch 1 opens after the completion of the wind-up operation and charging operation of the exposure control mechanism to turn the transistor 5 to a non-conductive state, such a change of output to low level from the perforation detector 6 will not be counted by the counter 18. Furthermore, when the switch 1 opens, the output from the inverter 60 changes to a high level signal. Thus, after a predetermined period of time determined by the delay circuit 61, the flip-flop 59 is turned to a reset condition to produces a high level signal from its $\overline{Q}$ terminal so as to bring the counter 18 again to an active condition capable of counting pulses from the perforation detector 6.

Next, a film transporting device of a second embodiment of the present invention is described with reference to FIG. 3. It is to be noted that the second embodiment has the same mechanical parts as that shown in FIG. 1.

Figure 3:
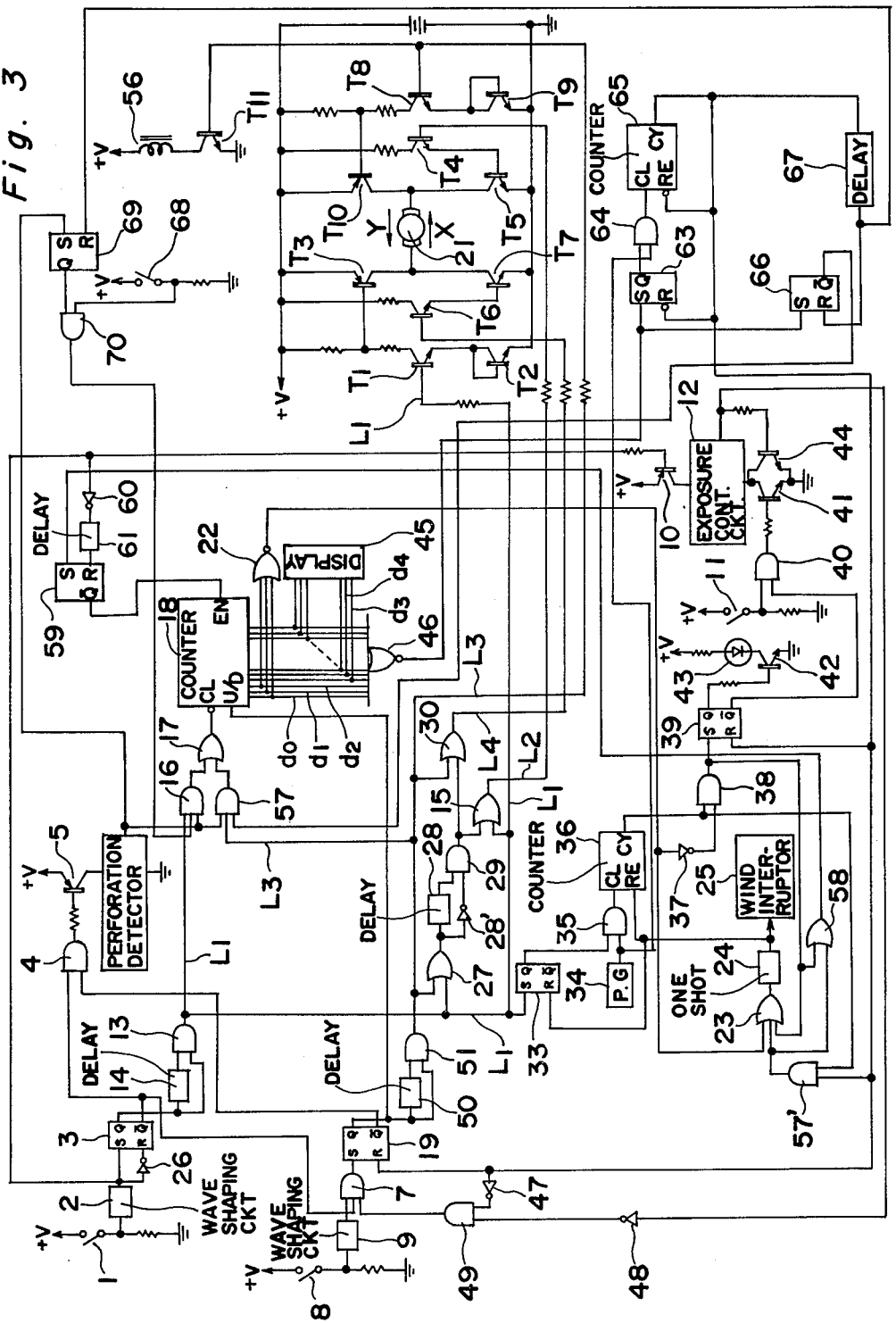
FIG. 3 is a circuit diagram according to a second embodiment of the present invention.

Referring to FIG. 3, as shown at the right-hand bottom portion of the drawing, the second embodiment further includes flip-flops 63, 66, AND gate 64, counter 65 and a delay circuit 67, and as shown at the right-hand upper portion thereof, flip-flop 69, AND gate 70 and a switch 68. Set terminals of flip-flops 63 and 66, respectively, are connected to the output of the NOR gate 46. The $\overline{Q}$ terminal of the flip-flop 66 is connected to AND gate 57. The Q terminal of the flip-flop 63 is connected to one input of AND gate 64. The other input of the AND gate 64 is connected to the pulse generator 34. The output of the AND gate 64 is connected to clock terminal CL of the counter 65. The counter 65 has a carry terminal CY which is connected to the delay circuit 67 and each reset terminal of counter 65, flip-flops 63 and 39. The output of the delay circuit 67 is connected to reset terminal of each of flip-flops 66 and 69. The output of the perforation detector 6 is connected to set terminal of the flip-flop 69 and, Q terminal of the flip-flop 69 is connected to AND gate 70. The switch 68 and a suitable resistor are connected in series between a constant voltage source and ground. A junction between the switch 68 and the resistor is connected to AND gate 70. The output of the AND gate 70 is connected to the input of the AND gate 16. Other circuitry shown in FIG. 3 are the same as that shown in FIG. 2.

According to the circuit of FIG. 3, the switch 68 turns on and off in response to closing and opening of the back lid 101 (FIG. 1), respectively. Therefore, during the wind-up operation after loading the film in the camera but holding back lid opened, the train of pulses applied to set terminal of the flip-flop 69 changes the flip-flop 69 to a set condition to produce a high level signal from Q terminal of the flip-flop 69, but the switch 68 remains open to prevent AND gate 70 from producing a high level signal. Accordingly, the AND gate 16 is deactivated to prevent the supply of a train of pulses from the perforation detector 6 to the counter 18. In this case, the wind-up operation for a predetermined length is carried out in the same manner as in the case of wind-up operation during no film loading described above in the previous embodiment. Usually, such a wind-up operation with the back lid 101 being opened is carried out for about "2" frames.

Then, when the back lid 101 is closed, the switch 68 turns on and, therefore, the AND gate 70 produces a high level signal, which is applied to the AND gate 16. Accordingly, the AND gate 16 is activated to permit the transfer of a train of pulses from the perforation detector 6 to the counter 18. Usually, "3" blank shots are taken from closing of the back lid 101 to taking photographs. Therefore, in total, usually, there are "5" frames wound on the take-up spool 103 before taking photographs. According to the second embodiment, the display device 45 is so designed that it displays nothing or a character "E" when the content of the counter 18 is "0". When the content of the counter 18 is either 1, 2 or 3, the display device 45 displays "0". Then, as the content of the counter 18 increases one by one from "4", i.e., 4, 5, 6, —, the display device 45 displays a numerical figure that increases one by one from "1", i.e., 1, 2, 3, —.

Next, the rewind operation is described. The rewind operation is carried out in a similar manner to that carried out in the first embodiment. When the counter 18 has counted down to "000—000", the NOR gate 46 produces a high level signal which is used for setting the flip-flop 63, thereby providing a high level signal from Q terminal of the flip-flop 63 to the AND gate 64. Thus, the AND gate 64 permits transmital of clock pulses from the pulse generator 34 to clock terminal CL of the counter 65. Accordingly, the counter 65 starts to count the clock pulses. The counter 65 is so designed as to count a predetermined number of pulses to count a time period which is slightly longer than a time period necessary to rewind "2" frames. When the counter 65 has counted the predetermined number of pulses, its carry terminal CY produces a pulse which is applied to the reset terminal R of the flip-flop 19. Accordingly, by the positive edge of the pulse produced from the counter 65's carry terminal CY, the flip-flop 19 turns to reset condition, producing a high level signal from its $\overline{Q}$ terminal and a low level signal from its Q terminal. Thus, the transistors T4, T5, T6 and T7 are turned to conductive state in a manner described above to shortcircuit two terminals of the motor 21. Thus, the motor 21 stops immediately with a braking effect.

During the rewinding operation, and when the content of the counter 18 reaches "000—000", the NOR gate 46 produces a high level signal and, accordingly, the flip-flop 66 is turned to the set condition. Thus, the $\overline{Q}$ terminal of the flip-flop 66 produces a low level signal which is applied to the AND gate 57. Thus, the AND gate 57 is deactivated to prevent the train of pulses from being applied to the counter 18. This operation is to prevent an undesirable count-down of the counter 18 after being counted down to "000—000". More particularly, according to the second embodiment, since a couple of frames are already wound on the spool 103 before the counter 18 starts to count-up from "000—000", during the rewinding operation, and when the content of the counter 18 has reached "000—000", there are still a couple of frames wound on the spool 103, Although the camera automatically rewinds such couple of frames by the motor 21 controlled by the counter 65, the train of pulses produced from the perforation detector 6 during the rewinding of such couple of frames will not be added to the counter 18 and, thus, the counter 18 remains holding a zero "000—000".

After the counter 18 has been counted down to "000—000", and after a predetermined period of time from the moment when the counter starts to count pulses from the pulse generator 34, the counter 65 produces from its carry terminal CY a pulse which is fed to a delay circuit 67. Accordingly, after a predetermined time period, the delay circuit 67 produces a pulse which is applied to each of the flip-flops 69 and 66. Thus, the flip-flops 69 and 66 are turned to a reset condition to bring the circuit in an initial condition. At this time, the film remains inserted in between the inner cover 102 and the body 100 as is the case with the initial insertion thereof, but the perforation on the film is disengaged from the tooth 105a of the sprocket 105, and accordingly, the film can readily be removed from the camera.

Figure 4:
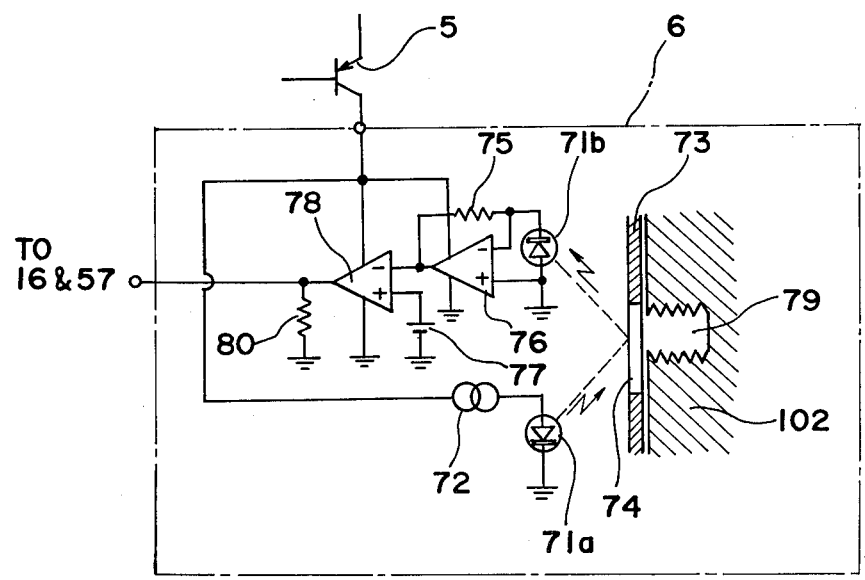
FIG. 4 is a perforation detector employed in the first and second embodiments.

Referring to FIG. 4, the perforation detector 6 described above in connection with FIG. 2 or 3 is defined by a reflection type photocoupler having a light emission element such as, a light emitting diode 71a, and a light receiving element 71b. The light emitting diode 71a is actuated by a constant current source 72 to produce a light beam having a predetermined light intensity. As shown in FIG. 1, the photocoupler 108 is mounted in the camera body 100. The light emitted from the light emitting diode 71a is directed to one side of a film 73 where the perforations 74 (only one perforation is shown in FIG. 4) are formed.

When the perforation 74 is absent in the path of light emitted from the light emitting diode 71a, the light from the light emitting diode 71a is reflected on the film surface and impinges on the light receiving element 71b. In this case, a current flowing through a resistor 75 increases and, therefore, the voltage level at the output of an operational amplifier 76 becomes greater than a reference voltage level determined by a constant voltage source 77. Accordingly, an operational amplifier 78 produces a low level signal.

Contrary, when the perforation 74 is present in the light path, the light emitted from the light emitting diode 71a directs into a hole 79 formed in the inner cover 102. Since the inside face of the hole 79 is a threaded, the light beams directed into the hole 79 make a diffused reflection and, therefore, hardly any light will be direct to the light receiving element 71b. In this case, the voltage level at the output of the operational amplifier 76 is smaller than the reference voltage level and, therefore, the operational amplifier 78 produces a high level signal.

In this manner, as the film moves in the direction of film winding or film rewinding, the operational amplifier 78 produces a train of pulses which is applied through the AND gate 16 or 57 to the counter 18. When the transistor 5 becomes non-conductive, the operational amplifiers 75 and 78 become inoperative and, therefore, by a resistor 80, a low level signal is produced from the output of the perforation detector 6.

It is to be noted that instead of the reflection type, the perforation detector 6 can be formed by a through type photocoupler in which the light emitting element and light receiving elements are disposed on opposite sides of the film path. Furthermore, the perforation detector 6 can be formed by a mechanical switch member, such as a limit switch.

Figure 5A:
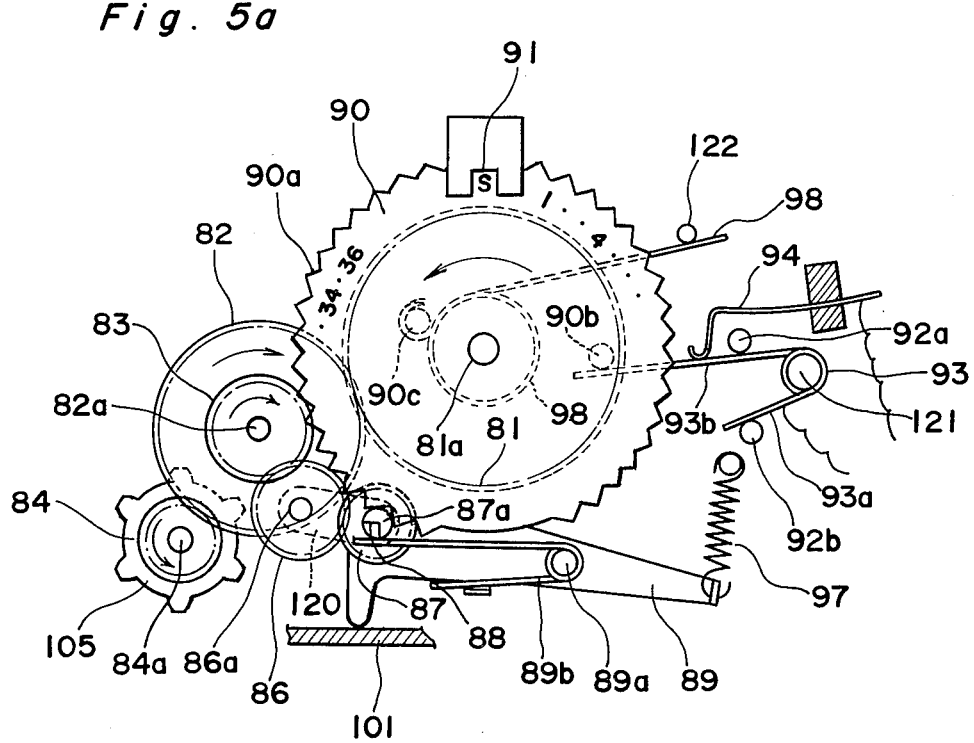
FIG. 5a is a diagrammatic top plan view of mechanical counter arrangement according to a third embodiment of the present invention.
Figure 5B:
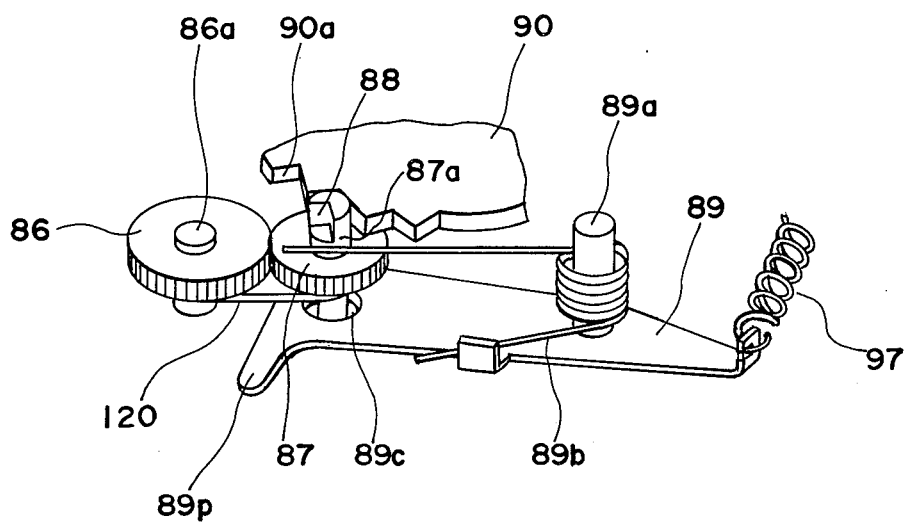

Referring to FIGS. 5a and 5b, there is shown a film transporting device according to a third embodiment of the invention.

In FIG. 5a, a gear 81 is mounted on a shaft 81a which is coaxially and frictionally connected to the spool 103. Accordingly, as the spool 103 is driven by a drive mechanism (not shown), the gear 81 rotates in the same speed. A frame number indication disc 90 having ratches 90a is formed therearound except a portion is freely mounted on the shaft 81a. Thus, the disc 90 rotates independently of the gear 81 in a manner described later. The gear 81 engages a gear 82 which is mounted on a shaft 82a. Also mounted on the shaft 82a is a gear 83 fixedly connected to the gear 82 and having a diameter smaller than the gear 81. The gear 82 in turn engages with a gear 84 fixedly connected to a shaft 84a for the sprocket 105. Therefore, through the gears 81, 82 and 84, the driving force of the spool 103 is transmitted to the sprocket 105. During the wind-up operation, the spool 103 takes up the film while the sprocket 105 advances the film.

The gear 83 engages with a gear 86 mounted on a shaft 86a. As best shown in FIG. 5b, a plate 120 is pivotally mounted on the shaft 86a. At an end portion of the plate 120 remote from the shaft 86a, a shaft 87a is rotatably mounted, and on said shaft 87a a gear 87, which is engaged with the gear 86, is fixedly mounted. At the upper end portion, the shaft 87a is formed with a V-cut 88 for the engagement with one of the ratches 90a of the disc 90. The lower end portion of the shaft 87a extending downwardly through the plate 120 is located in an elongated opening 89c formed in a lever 89. By the pivotal movement of the plate 120, the shaft 87a changes its position between an engaged position in which the shaft 87a is held in contact with the disc 90 to allow an engagement between the V-cut 88 and ratches 90a, and a disengaged position in which the shaft 87a is separated away from the disc 90. Such a change in position of the shaft 87a is effected by the lever 89 in a manner described below.

The lever 89 is formed with a projection 89p adjacent said opening 89c and is rotatably mounted on a pin 89a. A spring 97 is connected to the lever 89 so as to urged the lever 89 counterclockwise about said pin 89a. When the back lid 101 is closed, the back lid 101 pushes the projection 89p to rotate and hold the lever 89 in a position shown in FIG. 5a against the biasing force of the spring 97. Furthermore, a spring 89b is connected between the plate 89 and the shaft 87a for biasing the shaft 87a counterclockwise about the shaft 86a, so as to hold the shaft 87a in contact with one of the ratches 90a when the back lid 101 is closed. When the back lid 101 opens, the spring 97 rotates the lever 89 counterclockwise about the pin 89a until such a counterclockwise rotation of the lever 89 is restricted by the engagement between the inner wall of the opening 89c and the shaft 87a. At this time, the plate 120 is so pivoted as to separate the shaft 87a from the disc 90.

The disc 90 has two projections 90b and 90c provided on its bottom face. A hair-pin spring 93 made of electrically conductive material and having two arms 93a and 93b is mounted on a shaft 121. The two arms 93a and 93b producing an opening force are held in between two pins 92a and 92b provided on the camera body. The arm 93b extends along the bottom surface of the disc 90 to permit a contact between the arm 93b and the projection 90b when the disc 90 is rotated counterclockwise. An intermediate portion of the arm 93b is normally held in contact with an L-shaped spring lever 94 made of electrically conductive material to define an electric path through the L-shaped spring 94 and the hair pin spring 93 for the power supply to the motor for driving the film wind-up and rewind mechanism (not shown). A spring 98 is mounted on a shaft 81a. One end of the spring 98 is fixedly connected to the projection 90c and its other end is held in contact with a pin 122 provided on the camera body so as to provide a clockwise rotational force to the disc 90. The disc 90 further has a plurality of markings "S", "1",—, "36" for the indication of frame number through a display window 91. In FIG. 5a, only a part of such markings is shown.

Next, the operation of the film transporting device according to the third embodiment is described.

When the back lid 101 is opened, contracting force of the spring 97 rotates the lever 89 counterclockwise about the shaft 89a. Accordingly, the plate 120 pivots counterclockwise about the shaft 86a to bring the shaft 87a in the disengaged position. Thus, ratches 90a of the disc 90 is freed from the V-cut 88. At this moment, since the biasing force of the hair pin spring 93 is stronger than that of the spring 98, the pin 90b is held in contact with the arm 93b which arm 93b is in turn held in the position by the pin 92a, as shown in FIG. 5a. Furthermore, at this moment, the L-shaped lever 94 contacts the hair pin spring 93 to define the electric path for the power supply to the motor.

Then, after loading a film cartridge in the camera and when the leading portion of the film is inserted in between the inner cover 102 (FIG. 1) and the camera body 100 with the leading portion of the film touching the sprocket 105, a couple blank shots, for example two blank shots, are taken with the back lid 101 still being held open. When such blank shots are taken, both the spool 103 and the sprocket 105 rotate to wind-up the leading portion of the film on the spool 103. However, the disc 90 remains still in the position shown in FIG. 5a, because the rotation of the shaft 87a will not be transmitted to the disc 90.

Then, when the back lid 101 is closed, it pushes the projection 89p to rotate the lever 89 clockwise about the pin 89a. Consequently, the shaft 87a comes into contact with the peripheral face of the disc 90 where the ratches 90a are formed. Thereafter, further blank shots, for example three blank shots, are taken. When such blank shots are taken, a wind-up operation is carried out in the same manner described above and, at the same time, for each shot the shaft 87a makes one complete clockwise rotation which effects a small degree counterclockwise rotation of the disc 90 by the engagement between the V-cut 88 and one of the raches 90a. Accordingly, when the three blank shots are taken, the display window 91, which has been showing the marking "S", shows a marking "1".

Thereafter, upon one photographing, the marking displayed through the window 91 increases by one.

When a rewind switch (not shown) is turned on manually or automatically after taking the final picture, the motor is so rotated as to rotate the spool 103 and the sprocket 105 clockwise. And, at the same time, the shaft 87a is rotated counterclockwise to rotate the disc 90 clockwise. When the disc 90 is so rotated clockwise as to locate the marking "S" in the display window 91, as shown in FIG. 5a, the projection 90b comes into contact with the arm 93b. At this moment, since the L-shaped spring 94 and the spring 93 are held in contact with each other, the motor continues to run causing a further rewind operation. Thus, by the further clockwise rotation of the disc 90, the projection 90b pushes the arm 93b downwardly in the direction away from the pin 92a. When the disc 90 is rotated clockwise for a degree corresponding to two frames from the position shown in FIG. 5a, the L-shaped spring 94 comes into contact with the pin 92a causing a separation between the L-shaped spring 94 and the hair pin spring 93. Accordingly, the power supply path to the motor is intercepted to stop the motor, thereby stopping the rewind operation.

When the motor stops, the leading portion of the film is located away from the sprocket 105 resulting in disengagement between the sprocket teeth 105a and the perforation.

Then when the back lid 101 is opened to take out the used film, the lever 89 rotates counterclockwise to disengage the V-cut 88 from one of the ratches 90a. Accordingly, by the biasing force of the hair pin spring 93, the disc 90 is rotated counterclockwise until the "S" marking comes in alignment with the display window 91, as shown in FIG. 5a. At this position, the power supply path to the motor is again established ready for winding-up the next film.

Figure 6:
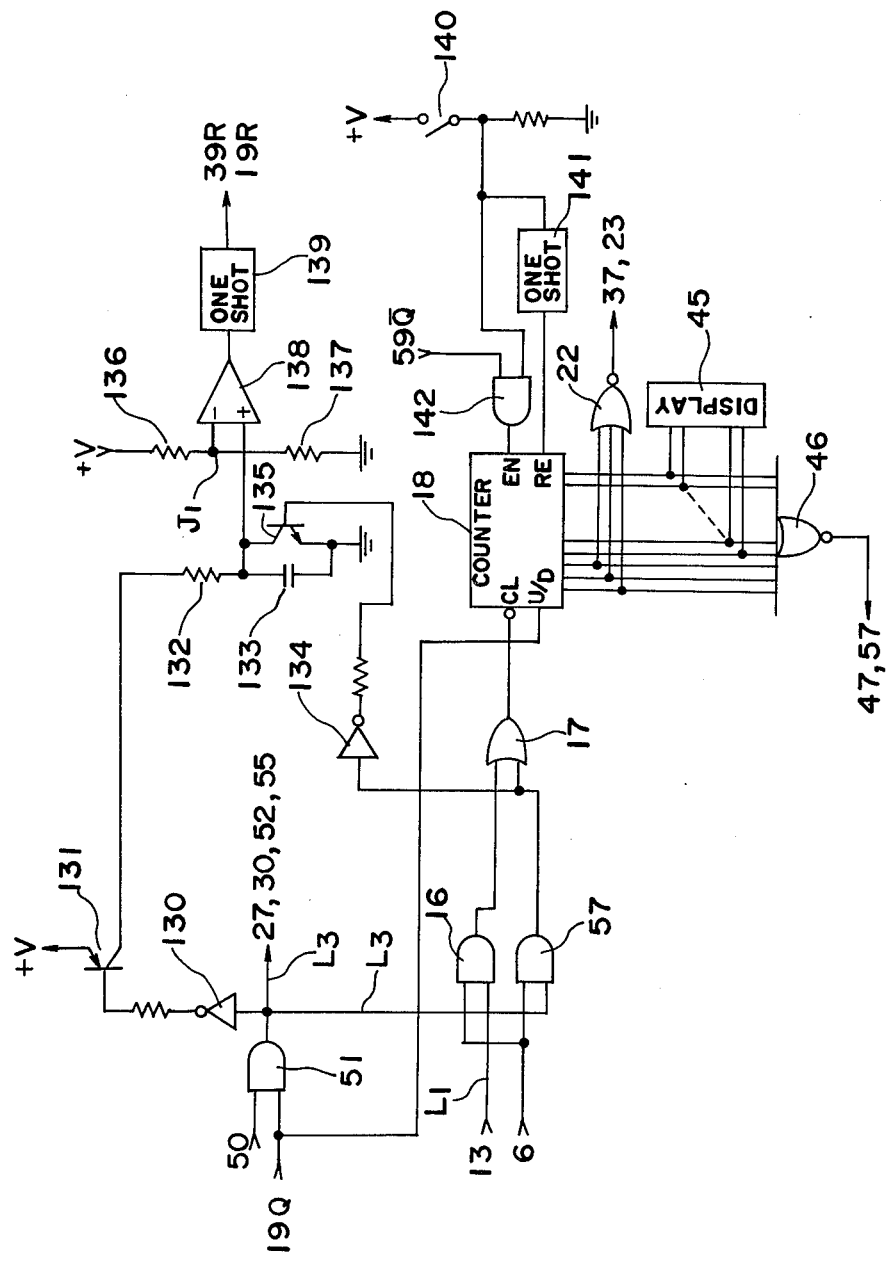
FIG. 6 is a circuit diagram showing a modification of the circuit diagram of FIG. 2.

Referring to FIG. 6, a circuit diagram shown therein is a modification of the circuit shown in FIG. 2. During the rewind operation, the AND gate 51 receives a high level signal from Q terminal of the flip-flop 19 and also from the delay circuit 50. Accordingly, the AND gate 51 produces a high level signal which is applied along the lead line L3 to an inverter 130 in addition to the OR gate 27 and 30 and transistors T8 and T11. Accordingly, the inverter 130 produces a low level signal which is applied to a transistor 131. Thus, the transistor 131 is turned to a conductive state.

Furthermore, during the rewind operation, the AND gate 57 transmits a train of pulses from the perforation detector 6 to the counter 18 which is in the down-count mode. Accordingly, the counter 18 proceeds the down count operation.

The train of pulses produced from the AND gate 57 is also applied to an inverter 134 which then produces a train of negative going pulses to alternately switch on and off a transistor 135. More specifically, during a pulse period in which the inverter 134 is producing a negative going pulse, i.e., in which the perforation detector 6 is detecting a perforation, the transistor 135 is turned to a non-conductive state. During such a period, a capacitor 133 connected across the collector and emitter of the transistor 135 is charged by a current obtained from the transistor 131 through a resistor 132. On the contrary, during a pulse interval period in which the inverter 134 is not producing a negative going pulse, i.e., in which the perforation detector 6 is not detecting a perforation, the transistor 135 is turned to a conductive state. During such a pulse interval period, the capacitor 133 is discharged through the transistor 135.

During the rewind operation, the pulse period and the pulse interval period appear alternately. Therefore, the voltage across the capacitor 133 will not become higher than a predetermined voltage produced at a junction J1 between the resistors 136 and 137. Accordingly, during the rewind operation, a comparator 138 receiving voltage from the capacitor 133 and the junction J1 continues to produce a low level signal.

When the rewind operation completes to withdraw the film from the perforation detector 6, the perforation detector 6 continues to produce a high level signal which is applied through the AND gate 57 to the inverter 134. Thus, the inverter 134 continues to produce a low level signal. Accordingly, the transistor 135 is maintained in the non-conductive state permitting the continuous charge of the capacitor 133. When the capacitor 133 is so charged as to produce a voltage higher than that from the junction J1, the comparator 138 produces a high level signal which is applied to a one shot circuit 139 for producing a one shot pulse. Such a one shot pulse is applied to reset terminal R of each of the flip-flops 39 and 19. Accordingly, the motor is stopped immediately and, at the same time, the light emitting diode 43 stops emission of light to indicate that the rewind operation has been completed.

In the modification shown in FIG. 6, the output of the NOR gate 46 is connected to one input of the AND gate 57 and also to the input of the inverter 47.

A switch 140 is provided operatively in association with the back lid 101 such that the switch 140 is turned off upon closure of the back lid 101 and is turned on upon opening of the back lid 101. When the back lid 101 is held open, the switch 140 produces a low level signal and, accordingly, an AND gate 142 produces a low level signal to the enable terminal EN of the counter 18, maintaining the counter 18 in an inoperative condition. When the back lid 101 closes, a one shot circuit 141 produces a pulse to the reset terminal RE of the counter 18 for resetting the counter 18 to zero and, at the same time, the AND gate 142 is enabled to permit the transmital of a high level signal from $\overline{Q}$ terminal of the flip-flop 59 to the enable terminal EN of the counter 18, in the same manner described above in connection with FIG. 2. Accordingly, the counter 18 is in a condition ready for counting pulses from the perforation detector 6 in a manner described before.

Although all embodiments described above are constructed to automatically wind-up and rewind the film by means of a single motor, the present invention is not limited to such construction. For example, the present invention is effective for a film transporting device including two motors one of which is used for winding-up the film, and the other of which is used for rewinding the film. Furthermore, the present invention is effective for a film transporting device which is constructed to manually wind-up and rewind the film.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A film transporting device for use in a camera, comprising:
   means for winding-up a film loaded in the camera, said winding-up means including a sprocket which has a plurality of sprocket teeth and which is rotatable for winding-up the film with the sprocket teeth being engaged in perforations of the film;
   means for detecting said perforations at a detecting position before the sprocket with respect to the direction of wind-up of the film, said perforation detecting means being adapted to produce a pulse upon detection of each of said perforations;
   means for counting the number of pulses from said perforation detecting means;
   means for rewinding the film;
   means for generating a signal for interrupting the film rewind operation of said rewinding means in response to the number of the pulses counted by said counting means, said signal generating means being adapted to generate said signal when the film would be withdrawn from the sprocket.

2. A film transporting device as claimed in claim 1, wherein said counting means includes first means for counting the number of the pulses from said perforation detecting means during the film wind-up operation of said winding-up means and second means for counting the number of the pulses from said perforation detecting means during the film rewind operation of said rewinding means, and wherein said signal generating means includes means for producing said signal for interrupting the film rewind operation when the number of the pulses counted by said second counting means reaches a predetermined relation to the number of the pulses counted by said first counting means.

3. A film transporting device as claimed in claim 2, wherein said first counting means is constructed to start counting from a pulse corresponding to one of the perforations in a leader portion of the film, and wherein said signal producing means is adapted for producing said signal when the number of the pulses counted by said second counting means reaches the number equal to that counted by said first means.

4. A film transporting device as claimed in claim 3, wherein both of said first and second counting means include a common up-down counter which counts up the number of the pulses during the film wind-up operation and which counts down the number of the pulses during the film rewind operation.

5. A film transporting device as claimed in claim 3, further comprising means for displaying the number of the frames wound up by said winding-up means based on the number of the pulses counted by said first counting means.

6. A film transporting device as claimed in claim 3, further comprising means for displaying the number of the frames to be rewound by said rewinding means based on the relation between the number of the pulses counted by said first counting means and the number of the pulses counted by said second counting means.

7. A film transporting device as claimed in claim 3, further comprising means for producing a signal for interrupting the film wind-up operation of said winding-up means when said first counting means has counted a predetermined number of the pulses corresponding to one frame.

8. A film transporting device as claimed in claim 7, wherein both of said winding-up and said rewinding means include a common motor which is rotatable in two rotational directions opposite to each other for winding-up the film or for rewinding the film.

9. A film transporting device as claimed in claim 8, further comprising means for interrupting the rotation of said motor upon receipt of said signal for interrupting the film wind-up operation or upon receipt of said signal for interrupting the film rewind operation.

10. A film transporting device as claimed in claim 8, further comprising means for starting the film wind-up operation of said winding-up means in response to the completion of exposure control operation of the camera.

11. A film transporting device as claimed in claim 2, wherein said rewinding means includes a motor which is rotatable in a predetermined direction for rewinding the film, and wherein said signal generating means includes means, responsive to said counting means, for producing an output signal when the number of the pulses counted by said second counting means reaches a predetermined relation to the number of the pulses counted by said first counting means, and means for generating said signal for interrupting the film rewind operation after a predetermined period from receipt of said output signal.

12. A film transporting device as claimed in claim 11, further comprising means for interrupting the film rewind operation of said rewinding means upon receipt of said signal for interrupting the film rewind operation.

13. A film transporting device as claimed in claim 12, wherein said film rewind operation interrupting means is adapted for stopping the rotation of said motor.

14. A film transporting device as claimed in claim 11, wherein both of said first and second counting means include a common up-down counter which counts up the number of the pulses during the film wind-up operation and which count down the number of the pulses during the film rewind operation.

15. A film transporting device as claimed in claim 11, further comprising means for displaying the number of the frames wound up by said winding-up means based on the number of the pulses counted by said first counting means.

16. A film transporting device as claimed in claim 11, further comprising means for displaying the number of the frames to be rewound by said rewinding means based on the relation between the number of the pulses counted by said first counting means and the number of the pulses counted by said second counting means.

17. A film transporting device as claimed in claim 11, further comprising means for producing a signal for interrupting the film wind-up operation of said winding-up means when said first counting means has counted a predetermined number of the pulses corresponding to one frame.

18. A film transporting device as claimed in claim 17, wherein said winding-up means is constructed to rotate said motor of said rewinding means in a direction opposite to said predetermined direction for winding-up the film.

19. A film transporting device as claimed in claim 18, further comprising means for interrupting the film wind-up operation of said winding-up means upon receipt of said signal for interrupting the film wind-up operation.

20. A film transporting device as claimed in claim 19, wherein said film wind-up operation interrupting means is adapted for stopping the rotation of said motor.

21. A film transporting device as claimed in claim 11, further comprising means for starting the film wind-up operation of said winding-up means in response to the completion of exposure control operation of the camera.

22. A film transporting device as claimed in claim 1, wherein said signal generating means is adapted for generating said signal for interrupting the film wind-up operation when said perforation detecting means produces no pulses because of absence of the perforations of the film at said detecting position.

23. A film transporting device as claimed in claim 22, wherein said signal generating means includes means for detecting absence of pulses from said perforation detecting means at a predetermined period during the film rewind operation, and means for producing said signal upon detection of pulse absence by said pulse absence detecting means.

24. A film transporting device as claimed in claim 22, wherein said signal generating means includes means, during the film rewind operation, for forcing said counting means to count the number of the pulses in a direction opposite to the direction in which said counting means counts the number of the pulses during the film wind-up operation, and means for producing said signal when the number of the pulses counted by said counting means reaches a predetermined number corresponding to a condition in which the perforations of the film are withdrawn from the sprocket teeth.

25. A film transporting device as claimed in claim 22, further comprising means for producing a signal for interrupting the film wind-up operation of said wind-up means when said counting means has counted a predetermined number of the pulses corresponding to one frame.

26. A film transporting device for use in a camera, comprising:
- means for winding-up a film loaded in the camera;
- means for rewinding the film;
- means for counting, in a first direction, the number of frames wound-up by said winding-up means during the film wind-up operation, said counting means being adapted for counting, in a second direction opposite to said first direction, the number of frames rewound by said rewinding means during said rewind operation;
- means for enabling the count operation of said counting means upon closure of a back lid of the camera;
- means for resetting the number counted by said counting means into a predetermined initial condition upon opening of the back lid of the camera; and
- means for generating a signal for interrupting the film rewind operation of said rewinding means when said counting means has counted, in said second direction, a predetermined number of frames from said predetermined initial condition.

27. A film transporting device as claimed in claim 26, further comprising means for displaying the number of frames counted by said counting means.

28. A film transporting device for use in a camera comprising;
- means for winding up a film loaded in the camera;
- means for detecting perforations of a film at a predetermined detecting position, said perforations detecting means being adapted to produce a train of pulses upon detection of the perforations while the film is wound up past said predetermined detecting position;
- first means for counting the number of the pulses from said performance detecting means and for producing a count-up signal when the number of the pulses counted reaches a predetermined number corresponding to one frame;
- second means for counting a predetermined time after the start of the film wind-up operation of said winding-up means and for generating a time-up signal after counting up said predetermined time;
- means for detecting whether or not a film has been loaded in the camera;
- means for producing a signal for interrupting the film wind-up operation of said winding-up means upon receipt of said time-up signal in the case that said first counting means takes a time longer than said predetermined time to count up said predetermined number corresponding to one frame, or upon receipt of said count-up signal in the case that said first counting means has counted up said preetermined number before said second counting means produces said time-up signal, or upon receipt of said time-up signal in the case that said film loading detecting means detects that a film has been unloaded; and
- means for controllong an exposure operation of a camera to permit the start of said exposure operation upon receipt of said count-up signal in the case taht said film loading detecting means detects that a film has been loaded, to permit the start of said exposure operation in the case that said film loading detecting means detects taht a film has not been loaded, and to interrupt said exposure operation upon receipt of said time-up signal in the case that said film loading detecting means detects that a film has been loaded.

* * * * *